Sept. 3, 1957           N. SCHNOLL           2,805,392

ELECTRONIC MEASURING INDICATOR INSTRUMENT

Filed Aug. 31, 1953

INVENTOR.

Nathan Schnoll

United States Patent Office 2,805,392
Patented Sept. 3, 1957

2,805,392

ELECTRONIC MEASURING INDICATOR INSTRUMENT

Nathan Schnoll, Palisade, N. J.

Application August 31, 1953, Serial No. 377,465

2 Claims. (Cl. 324—62)

This invention relates to electrical measuring and testing devices and particularly to visual indicating means for alternating current bridges.

An object of this invention is to provide a novel visual indicating arrangement for electrical measuring bridges which has a high sensitivity in use, and yet is rugged and foolproof.

Another object of the invention is to provide an improved null indicator for alternating current bridges which indicates the direction of unbalance at a glance, making the operation of the bridge must simpler for the unskilled worker.

Still another object of the invention is to provide a novel visual indicator for electrical measuring bridges which is especially adapted to indicate when the unknown element is within certain limits or tolerance, and when the unknown element under test fails to meet the limits or tolerance, to indicate whether the element is over or under the value desired.

These and other objects are achieved, in accordance with this invention, by an electrical circuit arrangement which utilizes a pair of similar electron discharge device structures each having a gaseous glow discharge device serially connected in the current carrying circuit. A bridge circuit, such as a Wheatstone bridge or the like, is energized from a source of alternating current, and the two electron discharge devices are energized from the same source, but are fed voltages which are 180° out of phase with each other. Across the opposite diagonal of the bridge from which the energizing alternating current voltage is supplied, the balance or unbalance signal is derived in the usual way and is applied between the control electrodes (the grids) and the cathodes of both of the electron discharge devices. Due to the phase of the balance or unbalance signal, one of the two electron discharge devices will conduct more than the other if the bridge is unbalanced, and one of the glow lamps will light as a result of this current unbalance. When the bridge is balanced, both lamps will be dark.

A more detailed description follows in conjunction with the accompanying drawing, wherein.

Figure 1:
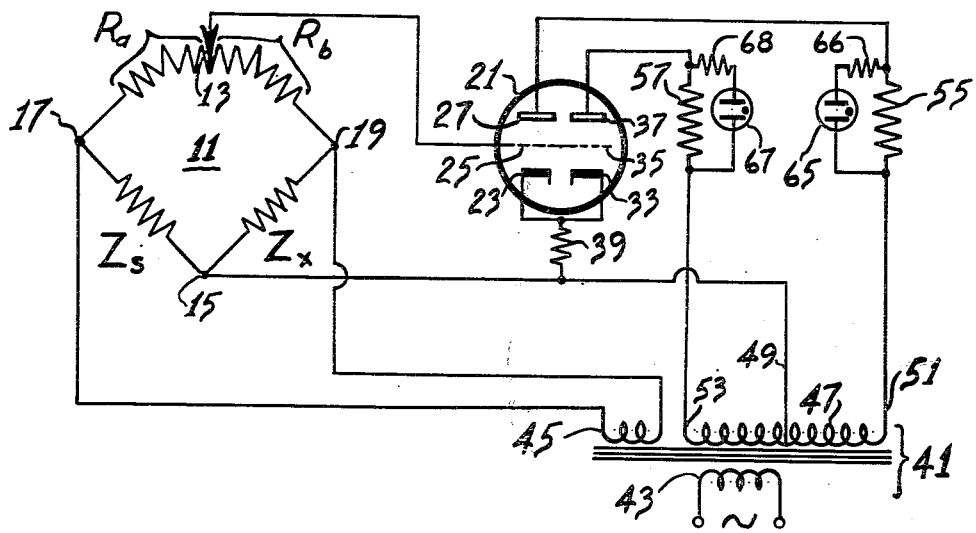
Fig. 1 is a schematic diagram of the circuit arrangement of the invention.

Referring now to Fig. 1, an electrical bridge circuit is shown which is composed of four arms, $R_a$, $R_b$, a standard impedance $Z_s$, and an unknown impedance $Z_x$. $R_a$ and $R_b$ are resistances whose resistance ratio of one to the other may be varied, as for example by a variable graduated tapped resistor as shown. Alternatively, $R_a$ or $R_b$, or both may be variable resistors. The tap or point between the resistors $R_a$ and $R_b$ is designated 13, and together with the junction designated 15 between the standard impedance $Z_s$ and the unknown impedance $Z_x$ forms one diagonal of the bridge.

The other diagonal of the bridge is constituted by the injunctions 17 and 19 between $R_a$ and $Z_s$ and between $R_b$ and $Z_x$, respectively.

Two electron discharge device structures are shown as a dual triode vacuum tube 21. The first triode section has a cathode 23, grid 25, and an anode 27, and the other triode section likewise has a cathode 33, a grid 35, and an anode 37. The cathodes 23 and 33 of both electron discharge devices are connected together and through a common cathode resistor 39 to the junction point 15. Both of the grids 25 and 35 are connected together and to the tap 13 between the resistors $R_a$ and $R_b$.

Operating alternating current for both the bridge 11 and the dual triode 21 are supplied from a transformer 41. A primary winding 43 is provided to be fed from a 50 or 60 cycle A. C. source. One secondary winding 45 provides the proper operating voltage to supply the bridge 11 with the current used for measurement indications and is connected across the diagonal 17, 19 of the bridge 11. Another secondary winding 47 is center-tapped and is used to supply the operating voltage and current for the two electron discharge device structures of the twin triode 21. The center-tap lead 49 of the secondary 47 is connected to the end of the common cathode resistor 39 which is connected to the junction point 15. This center tap 49 and junction point 15 will be referred to as a point of reference potential or ground potential.

The ends of the secondary winding 47 are designated 51 and 53 and are connected through dropping resistors 55 and 57 respectively to the anodes 27 and 37 of the two electron discharge device structures. Connected in parallel with the dropping resistor 55 is a gaseous glow discharge device 65 such as a neon glow tube and a current limiting resistor 66, and in the same manner, a glow discharge lamp 67 and its current limiting resistor 68 are connected in parallel to the dropping resistor 57 of the other triode.

In adjustment and operation of the balance indication system of the invention, the common cathode resistor 39 and the two anode or dropping resistors 55 and 57 are selected to have values which, with no voltage applied between the grids 25, 35 and cathodes 23, 33 the A. C. voltage from the transformer secondary 47 causes current to flow producing a voltage drop in the resistors 55 and 57 which is just barely insufficient to light the lamps 65 and 67.

As an example of the initial adjustment, let it be assumed that the glow lamps 65 and 67 have an ignition voltage of 50 volts and an extinguishing point of about 45 volts. The resistors 55 and 57 are chosen to produce a voltage drop of about 45 volts with a grid-cathode voltage of zero, which will correspond to a null condition of the bridge 11. When the grid voltage is positive with respect to the cathode, then one or the other of the lamps 65 or 67 will ignite.

Figure 2:
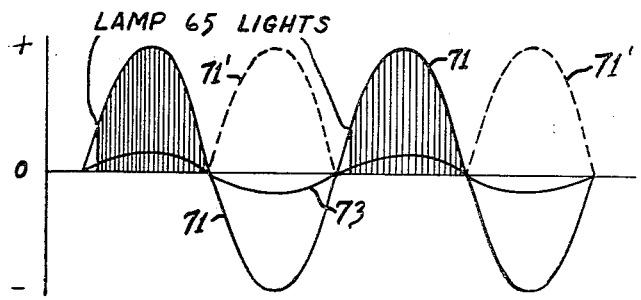
Figs. 2 and 3 are graphical representations of waveforms utilized in explaining the invention.
Figure 3:
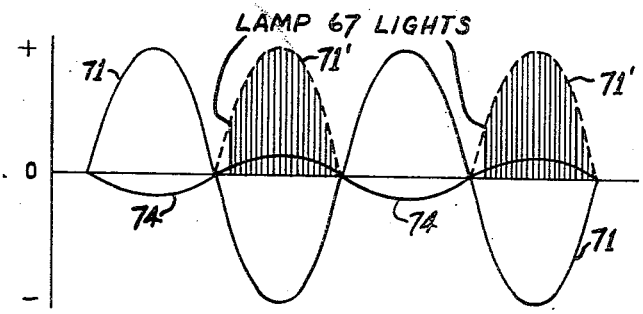

Referring now to Figs. 2 and 3 as well as to Fig. 1, A. C. voltage from the secondary 45 is applied to the opposite diagonal 17, 19 to which the tube electrodes are connected. If the bridge is balanced, that is if $$\frac{R_a}{R_b} = \frac{Z_s}{Z_x}$$

then no voltage appears across the diagronal 13, 15, and both lamps are dark.

In Fig. 2 there is shown a sine wave of voltage 71 representing the voltage applied to the anode 27 of the tube 21. A dotted waveform 71' is indicated which represents the positive voltage applied to anode 37. This waveform is inverted since it is on the other side of the center tap 49 which is taken as the reference or ground potential.

A second waveform 73 represents the unbalance of the brige appearing across the diagonal 13, 15. Since this voltage applied to grids 25 and 35 goes positive at the same time as the voltage 71 applied to the anode 27, this anode 37 will carry more current, causing a greater drop in the resistor 55, and causing the glow lamp 65 associated therewith to light. At the same time, the unbalance voltage 73 goes more negative when the other anode 37 is conducting, causing less current to flow through the other dropping resistor 57, and the lamp 67 is kept dark.

This indication of the lamp 65 (indicated by the shaded portion of the graphical waveforms in Fig. 2), assuming that the transformer secondaries 47, 45 are poled in the same way to produce a positive voltage at the point 19 at the same time that the anode 27 goes positive, shows that the resistance $R_b$ is too small or $Z_x$ is too large.

Passing from one side of the balanced condition in the bridge to the other produces a reversal of phase of 180° in the balance or unbalance signal. The situation where the bridge is unbalanced in the opposite condition to that just described is shown in Fig. 3. The voltage across the diagonal 13, 15 which is applied to the grids 25, 35 now goes positive at the same time as the anode voltage 71' applied to the anode 37 goes positive. This causes the resistor 57 to produce a greater voltage drop than the null condition, and the lamp 67 lights as indicated by the shaded portions of the waveforms.

In an embodiment of the invention successfully tried out in practice, the following components and values were used:

| | |
|---|---|
| R39 | 2,000 ohms. |
| R55 | 300,000 ohms. |
| R57 | 300,000 ohms. |
| R66 | 200,000 ohms. |
| R68 | 200,000 ohms. |
| Dual triode 21 | 12 AX7. |
| Glow lamps 65, 67 | NE-2. |
| $R_a + R_b$ | 5,000 ohms. |
| A. C. across 17, 19 | 20 volts. |
| A. C. across primary 43 | 117 volts. |
| A. C. across secondary winding 47 | 200 volts with tap at electrical center. |

With this arrangement, it was found that an unbalance of only 0.1 volt would cause one of the glow lamps to light. It will be appreciated that the sensitivity of the bridge can be increased quite easily by increasing the A. C. voltage applied to the terminals 17 and 19 of the bridge or by choosing higher values for the dropping resistors 55 and 57 and properly adjusting the value of the cathode resistor 39.

In one way of utilizing the balance indicator circuit of the invention the sensitivity of the bridge indicator is adjusted as just explained, and the bridge balanced with a standard impedance of the desired value as $Z_x$. The impedances to be tested are then inserted in arm designated as $Z_x$. If neither lamp lights, the unknown impedance is within the specified limits. If it is of too high a value, lamp 65 will light, and if it is below the desired value, lamp 67 will light.

In another way of utilizing the balance indicator circuit of the invention as a limit bridge, the tap 13 connected to a knob is set on a dial to the lowest permissible value at which one of the lamps will light. In this condition, the balance between resistors $R_a$ and $R_b$ is deliberately upset. If the unknown impedance to be tested, when inserted into the bridge, causes that particular lamp to light, the operator will then know at a glance that the unknown impedance under test is above or below the desired limit.

When capacitances are being measured, the standard impedance $Z_s$ is replaced with a standard capacitor, and the unknown capacitor is inserted as $Z_x$. The resistance arms $R_a$ and $R_b$ are used in the usual way to indicate the ratio of the known and unknown impedances. Similarly, with inductance measurement, a standard inductance is used for $Z_s$ and the inductance being measured is inserted in the arm $Z_x$, the two resistive arms being unchanged.

I claim:

1. The combination with a four-arm electrical bridge of which two adjacent arms are resistors adjustable relative to each other and the other two adjacent arms are a standard impedance and the impedance to be tested, there being one junction between said two resistors and another junction between said two impedances, both of said junctions forming one diagonal of the bridge, the other diagonal of the bridge being constituted by the two junctions between the respective impedances and the resistors to which they are directly connected, means to supply current from an alternating current source to one diagonal of the bridge; of an indicating system for said bridge comprising two evacuated electron discharge device structures each having an anode, a cathode and a grid, a direct metallic connection between said grids, a direct metallic connection devoid of concentrated impedance between said cathodes, a resistor having one end connected to said cathodes, means connecting the other diagonal of the bridge between the grids and the other end of said last resistor, means connecting the anodes of said discharge device structures to said same alternating current source such that the anodes are energized oppositely in phase relative to their cathodes, individual resistors connected to said anodes and positioned between said discharge structures and said energizing means, and individual glow discharge lamps connected in parallel with said last resistors, said last resistors having such selected values that with no voltage applied between the grids and the cathodes, corresponding to a null condition of said bridge, the voltage drop across the resistors is insufficient to light the lamps, one or the other of said lamps lighting up, but not simultaneously, only when its respective grid has a voltage applied thereto which is positive with respect to its cathode.

2. The combination with a four-arm electrical bridge having two sets of junctions, and a transformer winding to apply current from an alternating current source to one set of junctions; of an indicating system for said bridge comprising two evacuated electron discharge device structures each having an anode, a cathode and a grid, a direct metallic connection between said grids, a direct metallic connection devoid of concentrated impedance between said cathodes, a resistor having one terminal connected to said cathodes, means connecting the other set of junctions between the grids and the other terminal of said resistor, another transformer winding connecting the anodes of said discharge structures to said same alternating current source such that the anodes are energized oppositely in phase relative to their cathodes, individual resistive means in the current path of each of said discharge structures, and individual glow lamps connected in parallel with said resistive means, said resistive means having such selected values that with no voltage applied between the grids and the cathodes, corresponding to a null condition of said bridge, the voltage drop across said means is insufficient to light the lamps, one or the other of said lamps lighting up, but not simultaneously, only when its respective grid has a voltage applied thereto which is positive relative to its cathode.

References Cited in the file of this patent

UNITED STATES PATENTS

| | | |
|---|---|---|
| 2,434,822 | Beuren | Jan. 20, 1948 |
| 2,460,160 | Wittenberg | Jan. 25, 1949 |
| 2,505,072 | Sunstein | Apr. 25, 1950 |
| 2,567,700 | Ehlschlager | Sept. 11, 1951 |
| 2,666,164 | Albrecht | Jan. 12, 1954 |

FOREIGN PATENTS

| | | |
|---|---|---|
| 385,982 | Great Britain | Jan. 9, 1933 |